United States Patent Office 3,374,289
Patented Mar. 19, 1968

3,374,289
GRAFT POLYMERS FOR COATINGS, IMPREGNATIONS AND ADHESIVE FILMS FOR FIBRE SUBSTRATA
Karl-Heinz Ott, Harro Schlesmann, Karl Dinges, Oskar Glenz, Karl-Arnold Weber, and Fritz Kassack, Cologne-Stammheim, Germany, assignors to Farbenfabriken Bayer Aktiengesellschaft, Leverkusen, Germany, a German corporation
No Drawing. Filed Dec. 17, 1963, Ser. No. 331,116
Claims priority, application Germany, Dec. 22, 1962, F 38,632
5 Claims. (Cl. 260—885)

ABSTRACT OF THE DISCLOSURE

Grafting substrate of a saturated copolymer of p-isopropyl-α-methylstyrene and an ester of acrylic and/or methacrylic acid, the esterifying moiety thereof containing 1–10 carbon atoms and, as the grafting component, at least one ester of acrylic acid, the esterifying moiety thereof containing from 1–10 carbon atoms with permissible replacement of up to 50% by weight of said component with other mono-olefinically unsaturated compounds having a terminal $CH_2=C<$ group. A preferred embodiment embraces a grafting component wherein said olefinically unsaturated compound is an ether, ester or a Mannich base having groups which are capable of spontaneous cross-linking.

The present invention relates to the use of special graft copolymers for the production of thin sheet formations, more especially for coatings, impregnations and adhesive films of different types for use with fibre substrata and also for the laminating of foam plastics.

The use of elastomeric polymers, e.g. emulsions of butadiene-styrene or butadiene-acrylonitrile copolymers, as bonding agents for the production of fleeces or as adhesives in connection with the fibre-coating of textile sheet formations is known. Such copolymers containing butadiene certainly impart good elastic recovery to the finished fleeces and a good strength factor to the adhesive films or bonds and fibre-coatings, but cause discolouration and embrittlement under the action of air, light and heat on account of their unsaturated character. It is thus impossible to produce strictly white fleeces or fibre-coatings by using copolymers containing butadiene. It is, in fact, possible to produce white fleeces, fibre-coatings and other finishes which are resistant to ageing by using acrylic ester copolymers but again, these do not show any elastic recovery and have low stability to wet and to dry cleaning processes.

It has now been found that coatings, impregnations and laminatings having very good elastic recovery, which do not become discoloured and embrittled under atmospheric influences and which are resistant to wet and dry cleaning processes are attained, using many different types of fibre substrata, if special graft copolymers which are based on p-isopropyl-α-methylstyrene are used as bonding agent, coating agent, laminating agent or impregnating agent. These said special graft copolymers are based on A. 5 to 40% by weight of a grafting substrate, which is composed of a saturated copolymer of 1 to 30% by weight of p-isopropyl-α-methylstyrene and 99 to 70% by weight of an ester of acrylic and/or methacrylic acids, the alcohol moiety of which contains 1 to 10 carbon atoms, and B. 95 to 60% by weight of a grafting component, which is composed of one or more esters of acrylic acid with 1 to 10 carbon atoms in the alcohol moiety it being possible for up to 50% by weight of this or these acrylic acid esters to be replaced by other monoolefinically unsaturated compounds with a terminal $CH_2=C<$ group and adapted to be copolymerised with said esters.

In these graft copolymers, the grafting substrate A must moreover have such a composition that the proportion of p-isopropyl-α-methylstyrene in the graft copolymer is at least 0.3% by weight.

The grafting substrate of the graft copolymers to be used according to the invention comprises esters of acrylic or methacrylic acids with up to 10 carbon atoms in the alcohol moiety as well as p-isopropyl-α-methylstyrene. Specific examples of such compounds are acrylic or methacrylic acid esters, particularly of such saturated, aliphatic or cycloaliphatic alcohols as ethanol, propanol, butanol, 2-ethyl hexanol, N-decanol or cyclohexanol.

The graft copolymers to be used should, on the other hand, contain esters of acrylic acid (but not of methacrylic acid) with up to 10 carbon atoms in the alcohol moiety as grafting component B, advantageously esters of acrylic acid with such aliphatic, saturated, monohydric alcohols as methanol, ethanol, propanol, butanol, 2-ethylhexanol, N-decanol and cyclohexanol.

The acrylic acid esters mentioned above for use as grafting component can be replaced by up to 50% by weight of monoolefinically unsaturated compounds with a terminal vinyl or vinylidene grouping, which can be copolymerised with the esters. Examples of such compounds include methyl methacrylate, methacrylamide, acrylamide, methacrylonitrile, aromatic vinyl compounds such as styrene, styrenes substituted in the nucleus or in the α-position, unsaturated polymerisable acids such as acrylic, methacrylic and styrene-sulphonic acids and others, unsaturated polymerisable bases, such as vinyl pyridine, N,N-dimethylaminoethyl methacrylate, halogenous monomers such as vinyl chloride, vinylidene chloride and others.

Furthermore, monomers which contain spontaneously cross-linking groups, such as ethers, Mannich bases or esters can also be used for this.

According to one particularly preferred embodiment of the present invention, the grafting component B contains monomers with spontaneously cross-linking properties in such a quantity that 0.2 to 20% by weight and advantageously 0.5 to 10% by weight of an ether (see Formula I), of a Mannich base (see Formula II) or of an ester (see Formula III) of acrylamide or methacrylamide are present in the total graft copolymer.

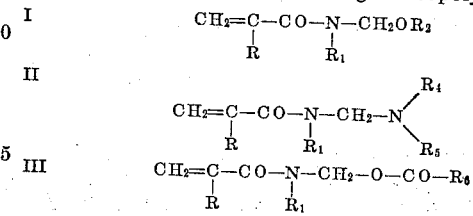

In the foregoing formulae which characterise the cross-linking component of the graft copolymers to be employed according to the invention:

R represents a hydrogen atom or a methyl group.
$R_1$ represents a hydrogen atom or an alkyl group with 1 to 8 carbon atoms.
$R_2$ represents an alkyl group, which can be branched or unbranched, saturated or unsaturated, a cycloalkyl group or the radical $—R_3—Z$, wherein $R_3$ represents an alkenyl group with 1 to 3 carbon atoms and Z represents a $—COOH$, $—OSO_3H$ (Na, K, $NH_4$), $—SO_3H$ (Na, K, $NH_4$), $—CN$, $—(CH_2CH_2O)_n—H$ group in which $n=1$ to 20, or a halogen atom.
$R_4$ and/or $R_5$ represents an alkyl group with 1 to 8 carbon atoms, a cycloalkyl radical or a group —R₃—Z as above, it being possible for R₄ and R₅ to be like or different and for —N(R₄R₅) to stand for the piperidine or morpholine radical, R₆ represents an alkyl group, branched or unbranched, with 1 to 20 carbon atoms.

The following are to be mentioned as examples of compounds which correspond to the aforementioned types:

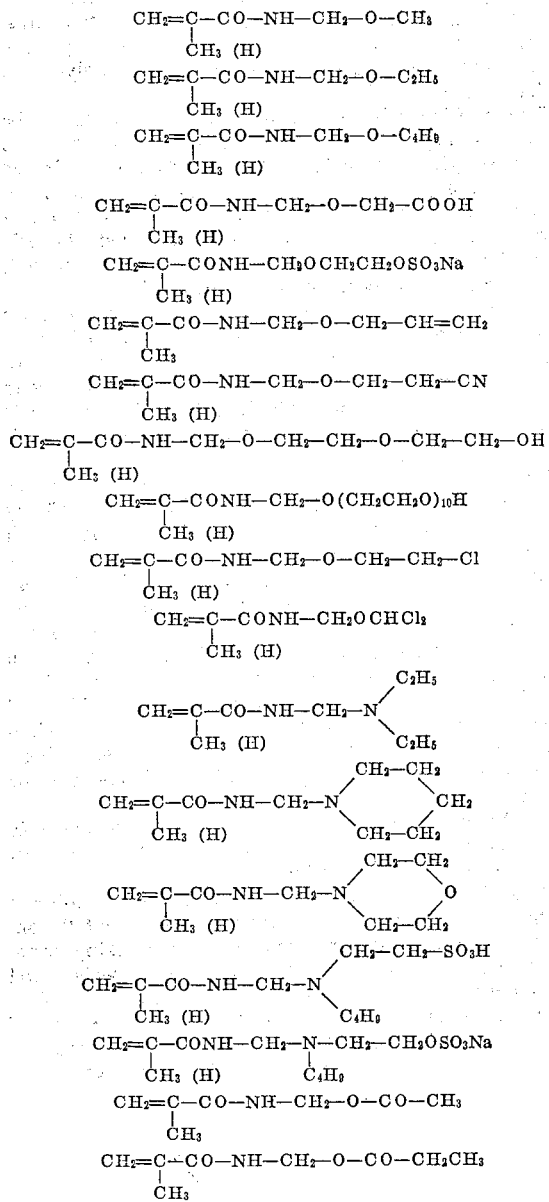

The production of the graft copolymers for use within the scope of the present invention can be effected in accordance with the process disclosed in German patent application F 38,6311Vd/39c filed Dec. 22, 1962 by graft polymerisation of the component of the component B in the presence of the component A in aqueous emulsion or in organic solvents with the aid of radical and more especially peroxydic polymerisation activators and also with the aid of redox systems.

It has been found that the graft copolymers defined above are outstandingly suitable for use as coatings, impregnations and adhesive films for laminating substrata of very different types and also for lining foam plastics. By the expression "coating" there is to be understood the improvement of textile structures, i.e. fabrics of very different types, the printing with coloured, and possibly thickened, pastes and also the coating of other fibre substrata, for example leather and the like. On the other hand the expression "impregnation" is to cover the improvement of a fibre per se. By "adhesive film" there is to be understood the bonding of fibres or fibrous materials with different types of supports, and more especially with fibres themselves. This expression is therefore to cover more especially the consolidation of fleeces, the fibre-coating of textiles and other sheet formations (adhesives for fibre-coating carried out in pattern formation and over entire surfaces), laminating of textile materials with one another or with other substrata, for example foam plastics, leather, rubber and the like.

Fleeces of many different types can be used as fibre substrata for such uses, for example tangled fibre fleeces, partially regular fleeces, which can be produced in known manner by carding or similar processes. Several layers of these fleeces having fibres disposed in parallel relationship can be superimposed, the fibres of the separate layers being disposed either parallel or in different directions. Completely irregular fibre fleeces (tangled fibre fleeces) can likewise be consolidated.

By means if these graft copolymers, it is possible to consolidate fleeces of all types of fibres e.g. of cellulose, cellulose derivatives, proteins or modified proteins, polyamides, polyesters, polyacrylonitrile, polyvinyl chloride, polyvinylidene chloride, polyolefine, vinylidene chloride-acrylonitrile or vinylidene cyanide-vinyl acetate copolymers, polyvinyl alcohol, glass, asbestos and other substances. Fleeces composed of a mixture of different types of fibres can likewise be consolidated. By textile fabrics. there are to be understood those of very different types. Materials such as paper, leather and the like are also examples of substrata having a fibrous structure.

The graft copolymers can be used in the form of powders, solutions or aqueous emulsions for the production of the coatings, impregnations, adhesive films or linings described above.

The high mechanical stability of the graft polymer emulsions makes them suitable for all methods of distribution in or on the fleece, for example by impregnation, spraying, foaming etc. The operation can also be carried out in two steps, in the first of which a preliminary consolidation is effected by spraying the loose fleece, while the final consolidation is effected in the second step by an impregnation process. For working purposes, the working concentrations of the emulsions are adjusted by dilution with water to a value which is generally between 10 and 30% of solids content.

The graft copolymer emulsions can additionally be mixed with known cross-linking agents, such as urea-formaldehyde or melamine-formaldehyde prepolymers and also with the acid donors necessary as catalysts for the final condensation. For the production of foams a surface-active substance is added to the binder emulsion e.g. an alkyl-benzene sulphonate and a foam stabiliser, e.g. KAl(SO₄)₂. The foam can be produced mechanically or pneumatically. Using these foams, the fleeces can either completely be impregnated or only the surface can be coated.

The polymer emulsion can per se have any desired pH during the working operation, but in practice it usually has a more or less strongly acidic pH, since the acid donors added to the emulsion for the cross-linking cause a change of the pH to the acidic range.

The drying of the impregnated fleeces takes place at temperatures at which the polymer, due to incorporated methylol ether, methylol ester and Mannich base groups, undergoes spontaneous cross-linking due to condensation reactions of these groups. Generally, temperatures from 100 to 200° C. are used. By adding acids or compounds which evolve acid under heat, such as phosphoric, maleic and tartaric acids, ammonium phosphate, ammonium nitrate or ammonium thiocyanate, this temperature can be lowered, for example to 80 to 130° C.

These acids and acidly acting compounds should be used in such quantities that the pH of the polymerisation dispersion to be introduced is between 2 and 5.

A fibre fleece which is finished with one of the graft copolymers described above is characterised by an excellent elastic recovery, which cannot be achieved with copolymers of similar monomer composition, but only with types of synthetic rubbers. In comparison with the fleeces finished with synthetic rubber, the fleeces finished with the saturated graft copolymers have, however, the advantage that they are resistant to ageing, that is to say, they do not become yellow or brittle under the action of light and/or oxygen; they are consequently also resistant to detergents containing peroxides when they are washed by boiling. Since the graft copolymers according to the preferred embodiment, in which they have a content of reactive groups, are cross-linked after heating, they are at the same time extremely resistant to organic liquids such as benzine and halogenated hydrocarbons such as trichloroethylene or tetrachlorethylene. The coatings, laminatings, fibre-coatings over complete areas or in pattern formation, using the graft copolymers which have been described, are produced by known processes. Furthermore, the graft copolymer emulsions can be used as binders in calico printing and in adhesive dyeing. In all instances, the finishes obtained are extremely resistant to wet and dry cleaning agents and become neither yellow nor brittle under the action of light and/or oxygen.

The parts indicated are parts by weight, unless otherwise mentioned.

A. PRODUCTION OF THE COPOLYMER COMPRISING BUTYL ACRYLATE AND P-ISOPROPYL-α-METHYLSTYRENE 2850 parts of salt-free water are mixed with 45 parts of a condensation product of 15 to 20 mols of ethylene oxide and 1 mol of o-hydroxydiphenylmethane in a glass polymerisation vessel which is equipped with a stirrer device, thermometer, reflux condenser and gas inlet tube. 1388 parts of butyl acrylate and 112.5 parts of p-isopropyl-α-methylstyrene are emulsified in this mixture and polymerised at 40 to 45° C. by adding 1.0 part of potassium persulphate, dissolved in 30 parts of water, and 1.5 parts of sodium pyrosulphite, dissolved in 30 parts of water. The reaction takes place exothermically and is complete after 8 to 10 hours. The result is a 31% latex, which is used as grafting base.

Example 1

10 parts of a 31% latex, a copolymer of 92.5 parts of butyl acrylate and 7.5 parts of p-isopropyl-α-methylstyrene (latex A, produced as indicated above) and 203.0 parts of a solution of 200 parts of salt-free water and 3 parts of a condensation product of 15 to 20 mols ethylene oxide and 1 mol of o-hydroxydiphenylmethane are mixed in a glass polymerisation vessel equipped with a stirrer device, thermometer, reflux condenser and gas inlet tube.

80 parts of butyl acrylate, 5 parts of styrene and 5 parts of acrylamide are emulsified in this mixture and the air is displaced by nitrogen. After heating the emulsion to 45° C., 0.3 part of potassium persulphate and 0.3 part of sodium pyrosulphite, each dissolved in 5 parts of water are added. The polymerisation starts immediately and is complete after 15 hours.

The 33% polymer dispersion which has formed is stable and does not contain any coagulate. 10 cc. of the dispersion obtained are poured onto a glass plate with the dimensions 10 x 10 cm. The film which forms after drying in air shows a high elasticity and strength.

If a fleece comprising crossed layers of copper cellulose is subjected to a needle-loom treatment for preliminary strengthening, impregnated with a 15% emulsion of the graft copolymer described above and thereafter dried at 70° C., this fibre fleece, when subjected to the mechanical test for tensile strength and breaking elongation (test in accordance with DIN-draft 53,455), has the following values:

Tensile strength: 16.5 kp./cm.$^2$
Breaking elongation: 45% of the secured length.

When using white fibre material, the fleece has a pure white colour, which is not disadvantageously influenced by the polymer contained in the binder, as is the case with rubber-like binders. It is characterized by a soft and elastic "handle." It is resistant to soap and detergent solutions containing peroxide and also to the organic liquids usually employed in chemical cleaning.

Example 2

Using the glass polymerisation vessel described in Example 1, 10 parts of a 31% latex of a copolymer of 91.5 parts of butyl acrylate and 7.5 parts of p-isopropyl-α-methylstyrene (latex A, produced as above) and 203 parts of a solution of 200 parts of salt-free water and 3 parts of a condensation product of 15 to 20 mols of ethylene oxide and 1 mol of o-hydroxyphenylmethane are mixed together.

80 parts of a monomer mixture consisting of 80 parts of butyl acrylate, 10 parts of styrene and 10 parts of acrylamide are now emulsified in this mixture. After displacing the air by nitrogen, the emulsion is heated to 45° C. and activated by adding 0.3 part of potassium persulphate, dissolved in 5.0 parts of water and 0.3 part of sodium pyrosulphite, dissolved in 2.0 parts of water. The polymerisation which starts immediately is complete after 15 hours and the approximately 33% polymer dispersion which has formed is stable and does not contain any coagulate. The films produced as in Example 1 show a very good elasticity and strength after having been dried in air. They do not show any discolouration on being heated for 24 hours at 80° C.

Example 3

Using the polymerisation vessel described in Example 1, 10 parts of a 31% latex of a copolymer of 92.5 parts of butyl acrylate and 7.5 parts of p-isopropyl-α-methylstyrene (see latex A) are mixed with a solution of 200 parts of water and 1.5 parts of a condensation product of 15 to 20 mols of ethylene oxide with 1 mol of o-hydroxydiphenylmethane as emulsifier. 90 parts of a monomer mixture consisting of 90 parts of butyl acrylate, 5 parts of acrylamide and 5 parts of methacrylamide methylol methyl ether are emulsified in this mixture. After displacing the air with nitrogen, the temperature of the stirred emulsion is raised to 45 to 50° C. After adding 0.3 part of sodium metabisulphite and 0.3 part of potassium persulphate, each dissolved in 5 parts of water, polymerisation starts almost immediately. After 15 hours, the polymerisation is complete and an approximately 33%, very stable dispersion is obtained.

The films produced from this dispersion as in Example 1 have a very good strength factor and high elasticity. They do not show any discolouration when heated for 24 hours at 80° C. A film heated for 5 minutes at 130° C. is insoluble in organic solvents only swelling to a very small extent.

If a needle-loomed fleece comprising crossed layers of copper cellulose is impregnated with a 15% emulsion of the previously described graft copolymer, dried at 70° C. and then heated for 5 minutes at 150° C. for cross-linking purposes, the mechanical testing of this fibre fleece for tensile strength and breaking elongation (test in accordance with DIN draft 53,455), the mechanical values indicated under Example 3 in Table 1 are obtained.

Comparison Example 3A

If the already repeatedly described copolymer of 92.5 parts of butyl acrylate and 7.5 parts of p-isopropyl-α-methylstyrene is mixed with a copolymer of 90 parts of butyl acrylate, 5 parts of acrylamide and 5 parts of methacrylamide methyl methylol ether, both copolymers being in the form of latices, and in the ratio of 10:90, the films produced from this latex mixture still have good elasticity and strength values, but the tensile strength of a needle-loomed crossed-layer fleece of copper cellulose finished with the latex mixture (impregnation and working up as in Example 3) is, however, greatly reduced (see Table 1, comparison Example 3A).

*Comparison Example 3B*

Using the glass polymerisation vessel already described in Example 1, 10 parts of a 31% butyl polyacrylate latex (latex B, produced as indicated below) are mixed with a solution of 200 parts of water and 1.5 parts of a condensation product of 15 to 20 mols of ethylene oxide and 1 mol of o-hydroxydiphenylmethane as emlusifier. 90 parts of a monomer mixture, as described in Example 3, are emulsified in this mixture and, after the air has been displaced by nitrogen, the temperature of the stirred emulsion is raised to 45 to 50° C. After adding 0.3 part of sodium metabisulphite and 0.3 part of potassium persulphate, both in 5 parts of water, the polymerisation reaction starts immediately and is complete after 15 hours. A very stable 33% dispersion is obtained. The films produced from this dispersion, as described in Example 1, have, however, only a very low strength value.

If a needle-loomed crossed-layer fleece of copper cellulose is treated with this polymer disperson in the manner already repeatedly described, the tensile strength values set out under 3B in Table 1 are produced after drying and brief heating at 150° C.

TABLE I

Test for tensile strength and breaking elongation in accordance with DIN-draft 53,455. (The test is carried out within one minute.)

| | Test Example 3 | Comparison Example 3A | Comparison Example 3B |
|---|---|---|---|
| Tensile strength, kp./cm.² | 50.7 | 29.3 | 12 |
| Breaking elongation percent of the secured length | 30 | 54.5 | 90 |

*Latex B (butyl polyacrylate latex).*—Using a glass polymerisation vessel equipped with a stirrer device, thermometer, reflux condenser and gas inlet tube, 800 parts of Wolfatite-softened water are mixed with 12 parts of a condensation product of 15 to 20 mols of ethylene oxide and 1 mol of o-hydroxydiphenylmethane. 400 parts of butyl acrylate are emulsified in this mixture and polymerisation is effected by adding 0.8 part of potassium persulphate and 20 parts of sodium metabisulphite, both in 3 parts of water. The reaction proceeds exothermically and is complete after 8 to 10 hours. The result is 33% latex, which was used as grafting base for the comparison Example 3B.

*Example 4*

Using a polymerisation vessel as already previously described, 10 parts of a 31% latex of a coplymer of 92.5 parts of butyl acrylate and 7.5 parts of p-isopropyl-α-methylstyrene (latex A) are mixed with a solution of 200 parts of water and 1.5 parts of a condensation product of 15 to 20 mols of ethylene oxide and 1 mol of o-hydroxydiphenylmethane as emulsifier. 90 parts of a monomer mixture consisting of 80 parts of butyl acrylate, 10 parts of styrene, 5 parts of acrylamide and 5 parts of methacrylamide methylol methyl ether are emulsified in this mixture. After displacing the air by nitrogen, the temperature of the stirred emulsion is raised to 45 to 50° C. After adding 0.3 part of sodium metabisulphite and 0.3 part of potassium persulphate, both dissolved in 5 parts of water, the polymerisation starts almost immediately. After about 15 hours, polymerisation is ended and an approximately 33% emulsion is obtained.

The films produced from this emulsion in the manner described in Example 1 have a very good strength value and a high elasticity. They do not show any discolouration on being heated for 24 hours at 80° C. A film heated for 5 minutes at 130° C. is insoluble in organic solvents and swells only slightly.

If a needle-loomed fleece consisting of crossed layers of copper cellulose is impregnated with the graft copolymer as described, dried at 70° C. and heated for 5 minutes at 150° C., this fibre fleece, when subjected to the mechanical test for tensile strength and breaking elongation, shows the mechanical values as set out under Example 4 in Table 2. In addition, the fleece has a soft "handle," a good elastic recovery and good resistance to soap, to detergent solutions containing peroxide and to solvents which are used in chemical cleaning.

*Comparison Example 4A*

If the copolymer of 92.5 parts of butyl acrylate and 7.5 parts of p-isopropyl-α-methylstyrene, as already previously described, is mixed with a copolymer of latex C (produced as described below), 80 parts of butyl acrylate, 10 parts of styrene, 5 parts of acrylamide and 5 parts of methacrylamide methylol methyl ether, in the ratio 10:90, both copolymers being used in the form of latices, the films produced from this latex mixture still show good elasticity and strength values, but the tensile strength of a needle-loomed, crossed-layer fleece of copper cellulose finished with this latex mixture (impregnation and working up as already repeatedly previously described) is reduced. See comparison Example 4A of Table 2 in this respect.

*Comparison Example 4B*

If the latex A which is used in Example 4 is replaced by a pure butyl polyacrylate latex (latex B), but in other respects the procedure is carried out in exactly the same manner as described in Example 4, a fibre fleece finished with this dispersion has the mechanical values which are set out in Table 2, under the heading comparison Example 4B.

TABLE 2

Test for tensile strength or breaking elongation in accordance with the DIN-draft 53,455. (The test is carried out within one minute.)

| | Example 4 | Comparison Example 4A | Comparison Example 4B |
|---|---|---|---|
| Tensile strength, kp./cm.² | 51.5 | 43.5 | 13.7 |
| Breaking elongation percent of the secured length | 26 | 27 | 71 |

*Latex C.*—Using the polymerisation vessel which has already been repeatedly described, 80 parts of butyl acrylate, 10 parts of styrene, 5 parts of acrylamide and 5 parts of methacrylamide methylol methyl ether are emulsified in 200 parts of Wolfatite-softened water with the aid of a condensation product of 15 to 20 mols of ethylene oxide and 1 mol of o-hydroxydiphenylmethane. By raising the temperature to 45° C. and adding 0.3 part of potassium persulphate, as well as 0.3 part of sodium metabisulphite, each dissolved in 5 parts of salt-free water, the polymerisation reaction is started. The reaction proceeds exothermically and is complete after about 15 hours.

*Examples 5 to 7*

Using the glass polymerisation vessel as already repeatedly described, 10 parts of a 33% latex of a copolymer of 80 parts of butyl acrylate and 20 parts of p-isopropyl-α-methylstyrene (Latex D, prepared as indicated below) and 201.5 parts of a solution of 200 parts of salt-free water and 1.5 parts of a condensation product of 15–20 mols of ethylene oxide with 1 mol of o-hydroxydiphenylmethane are mixed together. 90 parts of a monomer mixture having the following composition are now emulsified in the mixture:

|  | Example | | |
| --- | --- | --- | --- |
|  | 5 | 6 | 7 |
| Butyl acrylate ester | 90 | 80 | 85 |
| Styrene |  | 10 |  |
| Acrylonitrile |  |  | 5 |
| Acrylamide | 5 | 5 | 5 |
| Methacrylamide methylol methyl ether | 5 | 5 | 5 |

The initiation and continuation of the polymerisation take place in the manner already repeatedly described. Stable copolymerisation dispersions are obtained and the films produced from these dispersions, in the manner described in Example 1, are comparatively soft, but have an excellent strength value. If such a film is heated for 5 minutes at 130° C., it is insoluble or shows only slight softening in organic solvents such as toluene, acetone or dimethylformamide. No discolouration is observed after the film has been exposed to light for several days.

*Latex D.*—Using the polymerisation vessel already described in Example 1, 80 parts of butyl acrylate and 20 parts of p-isopropyl-α-methylstyrene in 200 parts of salt-free water are emulsified with the aid of 3 parts of a condensation product of 15 to 20 mols of ethylene oxide and 1 mol of o-hydroxydiphenylmethane and the polymerisation reaction is started by adding 0.3 part of potassium persulphate and 0.3 part of sodium metabisulphite, both dissolved in 5 parts of water, at a temperature of 45° C. The reaction proceeds exothermically and is complete after 15 hours. The resulting latex is used as a grafting base.

Example 8a

As described in Example 4, various graft copolymer emulsions are prepared, but instead of using methacrylamide methylol methyl ether, 5 parts of the following compounds are employed.

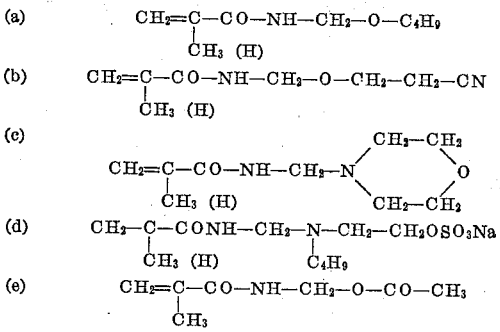

Stable graft copolymer emulsions are obtained and fleeces consolidated with these emulsions show the same favourable properties as in Example 4.

Example 9

A graft polymer emulsion is prepared as described in Example 4, but using 10 parts of methyl methacrylate instead of 10 parts of styrene. A graft copolymer emulsion is obtained which is extremely stable with respect to mechanical stressing. A crossed-layer fleece of copper cellulose consolidated with this emulsion shows the same favourable properties as in Example 4. For testing the fastness to washing, the fleece is subjected to a normal operation at 70° C. in a domestic washing machine. The washing liquor contains:

|  | G./l. |
| --- | --- |
| Soap | 5 |
| Soda | 2 |
| $NaBO_2 \cdot H_2O_2 \cdot 3H_2O$ | 0.8 |
| $MgCl_2 \cdot 6H_2O$ | 0.15 |
| Water glass, 35° Bé. | 1.2 |

The fleece maintains its shape in the washing operation and also does not lose any strength of elasticity. In order to test the resistance to solvents, a section of the fleece is extracted for 60 minutes in a Soxhlet apparatus with tetrachlorethylene and other sections of the fleece are each shaken for 30 minutes in benzine, trichlorethylene and tetrachlorethylene. The elasticity and the strength values are fully maintained; the loss in weight is extremely slight, and this can be considered as additional proof of the resistance to solvents.

Example 10

180 parts of "Latex A," diluted with 300 parts of water, are introduced into the polymerisation vessel which has already been repeatedly described. After adding 8 parts of an alkali metal salt of lauryl sulphate and 10 parts of a reaction product of 20 mols of ethylene oxide and 1 mol of stearyl alcohol, 260 parts of butyl acrylate, 60 parts of acrylonitrile, 10 parts of acrylamide and 10 parts of methacrylamide methylol methyl ether are emulsified while stirring. The emulsion is heated to 40° C. 1.2 parts of potassium persulphate and 1.2 parts of sodium pyrosulphite are added to start polymerisation. After the first violent reaction has subsided, the temperature is kept for 6 hours at 50° C. and the result is a very stable 40% latex.

Example 11

1000 parts of the emulsion prepared in Example 10 are mixed with 150 parts of a 10% aqueous solution of the ammonium salt of polyacrylic acid, 100 parts of dibutyl phthalate, 50 parts of hexamethylol melamine and 20 parts of a 50% aqueous solution of ammonium nitrate. This mixture is applied by means of a doctor in a quantity of 300 g./m.² to a roughened textile fabric. Thereafter, a 2 mm./10 den. polyamide flock is applied electrostatically and fixed for 10 minutes at 120 to 140° C. The result is an air-pervious fibre-coating over the entire area with a soft "handle" and high resistivity to ageing and to wet and dry cleaning.

Example 12

1000 parts of the emulsion prepared in Example 10 are mixed with 30 parts of hexamethylol melamine and 50 parts of a 10% aqueous solution of ammonium salt of polyacrylic acid. About 100 g./m.² of this mixture are applied by means of a cylinder-type applicator to a foil of polyether urethane foam having a thickness of 2 mm. A cotton fabric is placed thereon and drying is effected under gentle pressure for about 2 minutes at 140° C. The air-previous lining produced in this way is characterised by a very good bonding strength and also by its very good resistivity to benzine, trichlorethylene, tetrachlorethylene and to detergent solutions which contain peroxides.

Example 13

To a cotton fabric weighing about 100 g. per square metre and smoothed by frictional calendering is applied about 10 g. per square metre of a coating consisting of a mixture of 1000 parts of the emulsion prepared in Example 10, 30 parts of hexamethylol melamine and 10 parts of a 10% aqueous solution of ammonium salt of polyacrylic acid. The coating is applied by means of an air doctor and is then dried for about 2 minutes at 80° C. Further coatings of the mixture are applied by means of rubber cloth doctors, each being dried at 80° C., until there is a total coating of about 25 g. of solid substance per square metre. The coating is cured by heating for 3 minutes at 140° C. In this manner, there is obtained a soft, air-pervious and water-pervious coating with good resistance to ageing and to washing in soap and detergent solutions containing peroxide, and also to the solvents usually employed for chemical cleaning. They show no discolouration on being exposed to light.

Example 14

Using the polymerisation vessel already repeatedly described, 610 parts of "Latex A" and 1030 parts of salt-free water are initially introduced and then 15% of a mixture of 1200 parts of butyl acrylate, 480 parts of vinylidene chloride, 60 parts of acrylamide and 60 parts of methacrylamide methylol methyl ether are emulsified therein by stirring. The emulsion is heated to 40° C. and activated by adding 8 parts of ammonium persulphate and 8 parts of sodium pyrosulphite, each dissolved in 150 parts of water. The temperature rises to about 60° C. As soon as it has fallen to 55° C. the residual monomer mixture and also a solution of 50 parts of a reaction product of 1 mol of stearyl alcohol and 20 mols of ethylene oxide in 150 parts of water, are run in over 2 hours. By adding 4 parts each of ammonium persulphate and sodium pyrosulphite, both dissolved in 50 parts of water, the mixture is reactivated and stirring is continued for 5 hours at 50° C. The result is a very stable 51% emulsion, which is suitable for the production of coatings and consolidated fleeces. The finishes are resistant to ageing, to washing operations carried out in soap and detergent solutions containing peroxide and also to the solvents usually employed in chemical cleaning.

*Example 15*

80 parts of ammonium lauryl sulphate are dissolved in 2000 parts of salt-free water in a glass vessel. While stirring, 10% of a mixture of 1480 parts of ethyl acrylate and 120 parts of p-isopropyl-α-methylstyrene are emulsified. The emulsion is heated to 40° C. and the polymerisation is started by adding 3.2 parts of ammonium persulphate and 3.2 parts of sodium pyrosulphite, each dissolved in 100 parts of water. After the first violent reaction has subsided the remainder of the monomer mixture is run in over a period of 2 hours, the temperature being kept at 50° C. After completing this operation, reactivation is effected by adding 3.2 parts each of ammonium persulphate and sodium pyrosulphite, each dissolved in 100 parts of water. Stirring is continued for 5 hours at 50° C. and the result is a 40% latex of a copolymer which can be used as grafting base.

*Example 16*

78 parts of ammonium lauryl sulphate are dissolved in 1760 parts of salft-free water in a polymerisation vessel. 400 parts of a 40% emulsion of a copolymer of 7.5% p-isopropyl-α-methylstyrene and 92.5% of ethyl acrylate, prepared as in Example 15, and 10% of a mixture of 1200 parts of ethyl acrylate, 80 parts of styrene, 80 parts of acrylamide and 80 parts of methacrylamide methylol methyl ether are emulsified therein by stirring. The emulsion is heated to 50° C. and activated by adding 4.8 parts of ammonium persulphate and 4.8 parts of sodium pyrosulphite, each dissolved in 100 parts of water. After the initiation of the polymerisation, the remainder of the monomer mixture is run in over 2 hours, the temperature being kept at 50° C. After completing the addition stirring is continued for another 4 hours at 50° C. and the result is a very stable 41.5% emulsion. Using this emulsion, it is possible to consolidate fleeces and also to carry out coating, lining and fibre-coating operations, as described in Examples 9, 11, 12 and 13. The result in each case is a finish with a soft "handle" having outstanding resistance to ageing, and to soaps and detergent solutions containing peroxide, and to the solvents usually employed for chemical cleaning.

What we claim is:

1. A composition comprising a graft copolymer of (A) 5 to 40% by weight of a grafting substrate of a saturated copolymer of 1 to 30% by weight of p-isopropyl-α-methylstyrene and 99 to 70% by weight of an ester of acrylic or methacrylic acids and a saturated aliphatic alcohol containing from 1 up to 10 carbon atoms, and (B) 95 to 60% by weight of a grafting component comprising at least one ester of acrylic acid and a saturated aliphatic alcohol containing from 1 up to 10 carbon atoms and a compound selected from the group consisting of those of the formulae:

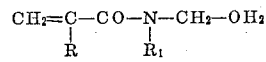

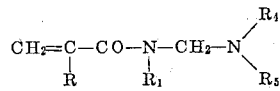

and

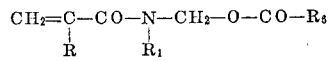

wherein R is hydrogen or methyl; $R_1$ is hydrogen or alkyl containing from 1 up to 8 carbon atoms; $R_2$ is alkyl, allyl, cycloalkyl or $-(CH_2)_m-Z$ where $m$ is an integer from 1 up to 3 and Z is $-COOH$, $-OSO_3H$ or the sodium, potassium and ammonium salts thereof, $-SO_3H$ or the sodium, potassium and ammonium salts thereof, $-CN$, $-(CH_2CH_2O)_n-H$ wherein $n$ is an integer from 1 to 20, or halogen; $R_4$ and $R_5$ are each alkyl having from 1 up to 8 carbon atoms, cycloalkyl or $-(CH_2)_m-Z$ wherein $m$ and Z are as aforesaid or together with the adjacent nitrogen atom form a piperidino or morpholino radical and $R_6$ is alkyl containing from 1 up to 20 carbon atoms; said graft copolymer containing at least 0.3% by weight of p-isopropyl-α-methylstyrene and from 0.2 to 20% by weight of the compound of said selected formula.

2. The composition of claim 1 wherein the compound of the selected formula is present in an amount of from 0.5 to 10% by weight, based on the weight of the total graft copolymer.

3. The composition of claim 1 wherein the compound of the selected formula is

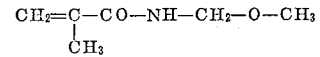

4. A textile fabric having applied to a surface thereof a cross-linked graft copolymer of claim 1.

5. A textile fleece impregnated with a cross-linked graft copolymer of claim 1.

References Cited

UNITED STATES PATENTS 2,926,126 2/1960 Graham et al. ____ 260—885 X
2,965,572 12/1960 Wuellner et al. ____ 260—885 X MURRAY TILLMAN, *Primary Examiner.*

WILLIAM D. MARTIN, *Examiner.*

T. G. DAVIS, J. T. GOOLKASIAN, *Assistant Examiners.*